United States Patent
Le Norcy et al.

(10) Patent No.: US 9,180,832 B2
(45) Date of Patent: Nov. 10, 2015

(54) AIR BAG FOR VEHICLES

(75) Inventors: Yohann Le Norcy, Valladolid (ES); Jean-Christophe Peyre, Viana de Cega (ES); Ramon Ramos, Viana de Cega (ES)

(73) Assignee: TRW Automotive GMBH, Alfdorf (DE)

( * ) Notice: Subject to any disclaimer, the term of this patent is extended or adjusted under 35 U.S.C. 154(b) by 0 days.

(21) Appl. No.: 14/002,135

(22) PCT Filed: Mar. 14, 2011

(86) PCT No.: PCT/EP2011/001247
§ 371 (c)(1),
(2), (4) Date: Oct. 3, 2013

(87) PCT Pub. No.: WO2012/122998
PCT Pub. Date: Sep. 20, 2012

(65) Prior Publication Data
US 2014/0015230 A1    Jan. 16, 2014

(51) Int. Cl.
*B60R 21/16* (2006.01)
*B60R 21/23* (2006.01)
*B60R 21/2342* (2011.01)
*B60R 21/00* (2006.01)
*B60R 21/2338* (2011.01)

(52) U.S. Cl.
CPC .............. *B60R 21/23* (2013.01); *B60R 21/2338* (2013.01); *B60R 21/2342* (2013.01); *B60R 2021/0004* (2013.01); *B60R 2021/0048* (2013.01); *B60R 2021/23382* (2013.01)

(58) Field of Classification Search
USPC ............................ 280/731, 732, 743.1, 743.2
See application file for complete search history.

(56) References Cited

U.S. PATENT DOCUMENTS

| | | | |
|---|---|---|---|
| 5,018,762 A | 5/1991 | Suzuki et al. | |
| 5,308,113 A * | 5/1994 | Moriset | 280/743.2 |
| 5,362,101 A * | 11/1994 | Sugiura et al. | 280/743.2 |
| 6,536,800 B2 | 3/2003 | Kumagai et al. | |
| 6,802,534 B2 * | 10/2004 | Neupert | 280/743.1 |
| 6,929,285 B2 * | 8/2005 | Yamada et al. | 280/743.2 |
| 7,134,691 B2 * | 11/2006 | Dunkle et al. | 280/743.2 |
| 7,360,789 B2 * | 4/2008 | Bito | 280/743.1 |
| 7,458,605 B2 * | 12/2008 | Hasebe et al. | 280/729 |
| 7,984,924 B2 * | 7/2011 | Yamada et al. | 280/743.2 |
| 2001/0052691 A1 * | 12/2001 | Bieber et al. | 280/730.1 |
| 2002/0024200 A1 | 2/2002 | Eckert | |
| 2003/0030254 A1 * | 2/2003 | Hasebe | 280/729 |

FOREIGN PATENT DOCUMENTS

| | | |
|---|---|---|
| DE | 196 43 052 | 9/1997 |
| DE | 198 60 827 | 7/2000 |
| EP | 0 714 815 | 6/1996 |
| EP | 1 140 568 | 3/2003 |
| EP | 1 405 770 | 3/2006 |
| EP | 1 951 560 | 7/2009 |

* cited by examiner

*Primary Examiner* — Toan To
(74) *Attorney, Agent, or Firm* — Tarolli, Sundheim, Covell & Tummino LLP (57) ABSTRACT

The invention relates to a gas bag (10) for vehicles, having in an inflated state a lower cushion portion (22) and an upper cushion portion (20) adapted for restraining a vehicle occupant (16), and a dividing portion (24) between the cushion portions (20, 22) which is formed by wall portions of the gas bag (10) extending into the interior of the gas bag (10) in a direction away from the cushion portions (20, 22).

17 Claims, 7 Drawing Sheets fig.2 fig.3

AIR BAG FOR VEHICLES

RELATED APPLICATIONS

This application corresponds to PCT/EP2011/001247, filed Mar. 14, 2011, the subject matter of which is incorporated herein by reference in its entirety.

BACKGROUND OF THE INVENTION

The invention relates to a gas bag for vehicles.

Gas bags are well-known for preventing or at least significantly reducing injury of a vehicle occupant in case of an accident. Gas bags typically are, in an inflated state, cushion-shaped and have an inflation opening through which pressurized gas can be introduced into the interior of the gas bag, in order to inflate the gas bag from a compact, folded condition into the inflated condition. FIG. 1 shows an example of such gas bag which here is a passenger gas bag. Reference numeral 10 designates the gas bag which is connected to an inflator 12 arranged in a dashboard 14 of the vehicle. Inflator 12 provides pressurized gas which builds up an internal pressure P in the gas bag, such that the gas bag can provide a restraining action for a vehicle occupant 16.

During the restraining action of the gas bag 10, a moment M is exerted on a neck of the vehicle occupant. This moment M results from an action of the tensioned wall of the gas bag. The interior pressure P present in the gas bag exerts a force F on the wall portion which is situated around the head 18 of the vehicle occupant, resulting in moment M. This is in particular a problem for a smaller vehicle occupant which contacts the gas bag in a lower portion, so that a large portion of the gas bag extends above the head of the vehicle occupant.

From EP 1 439 096 B1 a gas bag forming a single cushion is known which has elongated indentations and local projections in a plane surface facing towards the occupant. With these indentations and local projections a load imbalance between head load and chest load due to membrane forces in the airbag fabric shall be reduced.

SUMMARY OF THE INVENTION

The object of the invention is to provide a gas bag for vehicles which eliminates or at least reduces the force exerted by the gas bag on the head of a vehicle occupant, which could result in a moment acting on the neck of the vehicle occupant, in particular in case of a small vehicle occupant.

For achieving this object, the invention provides a gas bag for vehicles, having in an inflated state a lower cushion portion and upper cushion portion adapted for restraining a vehicle occupant, and a dividing portion between the cushion portions which is formed by wall portions of the gas bag extending into the interior of the gas bag in a direction away from the cushion portions. The invention is based on the idea of creating two almost independent cushion portions which are arranged, in case of an accident, in front of the vehicle occupant. If the vehicle occupant is large, the gas bag can act in a conventional manner and presents a large restraining surface to accommodate the vehicle occupant. If the vehicle occupant however is small, he or she is restrained by the lower cushion portion only, and the dividing portion between the two cushion portions ensures that the wall of the upper cushion portion does not exert a force on the head of the vehicle occupant which could create a moment in the neck of the vehicle occupant.

The dividing portion can be formed very effectively by at least one tether which extends towards the side of the gas bag which is facing away from the cushion portions. Apart from forming the dividing portion which acts as a constriction in the interior of the gas bag, the tether is able to counteract the traction forces resulting from the interior pressure in the gas bag.

The gas bag is formed by at least two fabric panels which are sewn together at their periphery. The dividing portion can be formed very effectively by those fabric panels, at least by portions of those panels. In case of gas bags being sewn out of three or more panels two of them or portions of two of them can easily form the dividing portion.

According to a preferred embodiment, the dividing portion is formed from two wall portions of the gas bag which in an inflated condition of the gas bag lie one against the other. This ensures that an almost continuous restraining surface is formed from the upper and the lower cushion portions, which is presented to a larger vehicle occupant.

The overlying portions of the gas bag can be sewn together by tear seams which tear away under load caused by the occupant during a restraint case.

An intermediate cushion can be arranged between the lower and the upper cushion portions, a dividing portion being formed between the lower cushion portion and the intermediate cushion portion, and between the intermediate cushion portion and the upper cushion portion. The provision of more than one cushion portion allows a more precise adaptation of the gas bag to different heights of the vehicle occupant.

According to an embodiment, the gas bag has an inflation opening which is arranged at a rear side of the lower cushion portion, the upper cushion portion being inflated via an overflow passage formed between the dividing portion and the gas bag wall which is facing away from the cushion portions. This construction of the gas bag is particularly suitable for gas bags arranged in a steering wheel or a dashboard of the vehicle.

Preferably, the end of the tether facing away from the cushion portions is attached at the inflation opening. The inflation opening requiring attachment means such as bolts etc. anyhow, so that the tether at its end remote from the cushion portions can be connected to these bolts, etc. without additional expenditure.

According to an alternative embodiment, the gas bag has an inflation opening which is arranged at a front side of the upper cushion portion, the lower cushion portion being inflated via an overflow passage formed between the dividing portion and the gas bag which is facing away from the cushion portions. This construction is particularly suitable for a gas bag which is arranged at the vehicle roof.

BRIEF DESCRIPTION OF THE DRAWINGS

The invention will now be described with reference to different embodiments which are shown in the enclosed drawings. In the drawings, FIG. 1 is a schematic cross-section of a gas bag according to the prior art, FIG. 2 is a schematic cross-section of a gas bag according to a first embodiment of the invention, FIG. 3 is an enlarged view of the gas bag of FIG. 3 with a smaller vehicle occupant being restrained, FIG. 4 is a schematic view of a gas bag according to a second embodiment of the invention, FIG. 5 is a schematic cross-section of the gas bag according to the second embodiment, FIG. 6 is a schematic cross-section of a gas bag according to the second embodiment when restraining a vehicle occupant, FIG. 7 is a schematic cross-section of the gas bag according to the second embodiment when restraining a smaller vehicle occupant, FIG. 8 is a schematic cross-section of the gas bag according to the second embodiment when restraining a larger vehicle occupant, FIG. 9 is a schematic cross-section of a gas bag according to a third embodiment when restraining a smaller vehicle occupant, FIG. 10 is a schematic cross-section of the gas bag according to the third embodiment when restraining a larger vehicle occupant, FIG. 11 is a schematic cross-section of a gas bag according to a fourth embodiment, and FIG. 12 is a schematic cross-section of a gas bag according to the invention under certain operating conditions, and FIG. 13 is a schematic cross-section of a gas bag according to a fifth embodiment of the invention.

DESCRIPTION OF THE EMBODIMENTS

Figure 1:
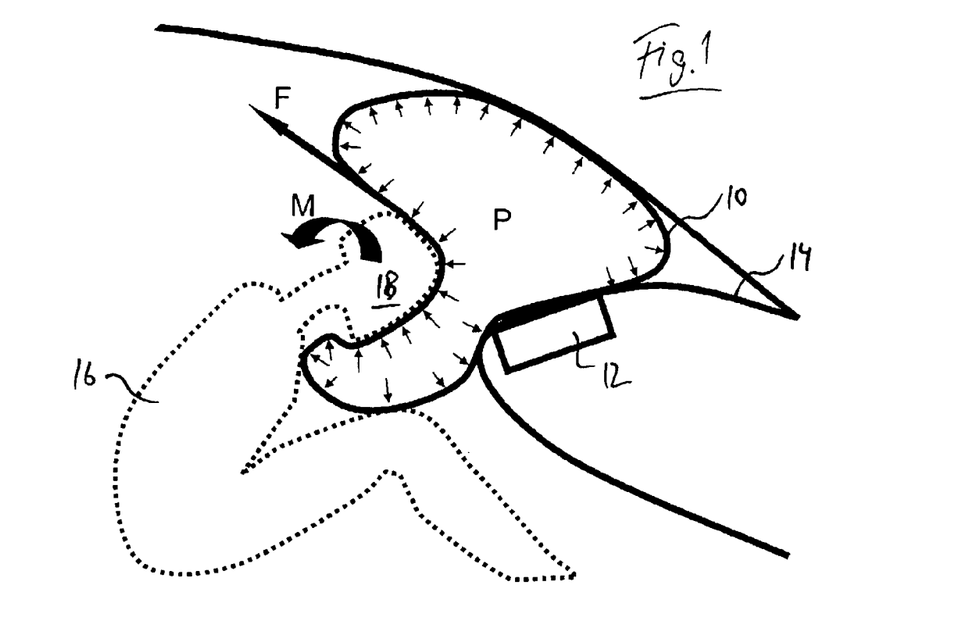
Figure 2:
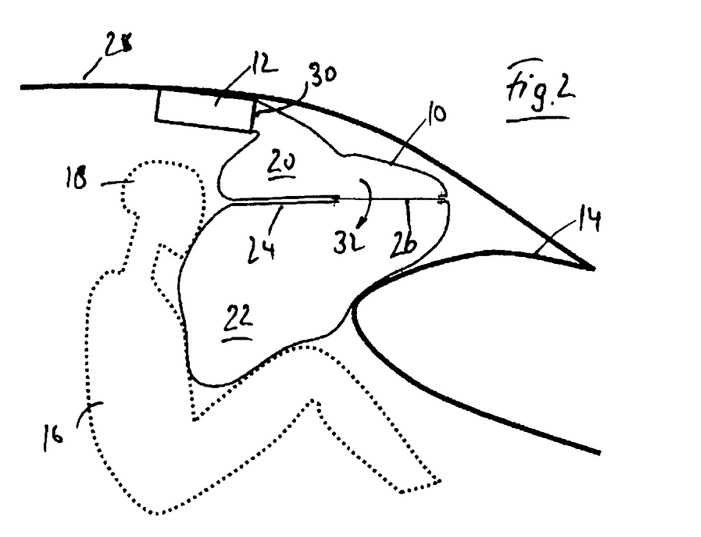

In FIG. 2, a gas bag 10 according to a first embodiment is shown. The gas bag is divided into an upper cushion portion 20 and a lower cushion portion 22, the two cushion portions 20, 22 being separated by a dividing portion 24 which is formed from two wall portions of the gas bag which, in an inflated condition of the gas bag, lie one against the other. Dividing portion 24 extends from an outer surface of the gas bag which faces a vehicle occupant, away from the vehicle occupant towards a side of the gas bag which faces away from the vehicle occupant. In the embodiment of FIG. 2, dividing portion 24 extends in a generally horizontal direction and has a considerable extent in a direction which is perpendicular to the sectional plane of this Figure. A tether 26 is used for creating a dividing portion despite the internal pressure which acts in the gas bag when being inflated. Tether 26 with one end is connected to the inner end of the dividing portion 24 and with its opposite end is connected to the gas bag at the side which is remote from the vehicle occupant. In the embodiment of FIG. 2, inflator 12 is arranged at a roof 28 of a vehicle and is connected to an inflation opening 30 of the gas bag, which is formed at upper cushion portion 20. Pressurized gas introduced into upper cushion portion 20 flows via an overflow passage 32 from upper cushion portion 20 to lower cushion portion 22, with overflow passage 32 being formed between the inner end of dividing portion 24 and the gas bag wall which is remote from the vehicle occupant.

Figure 3:
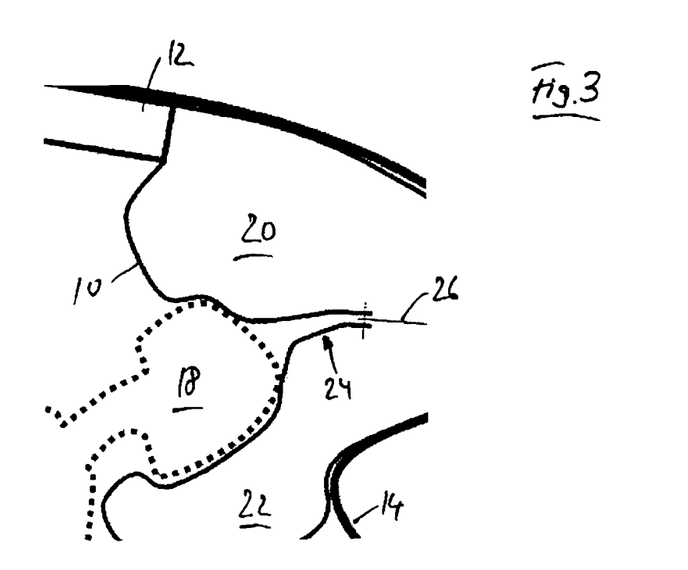
Figure 4:
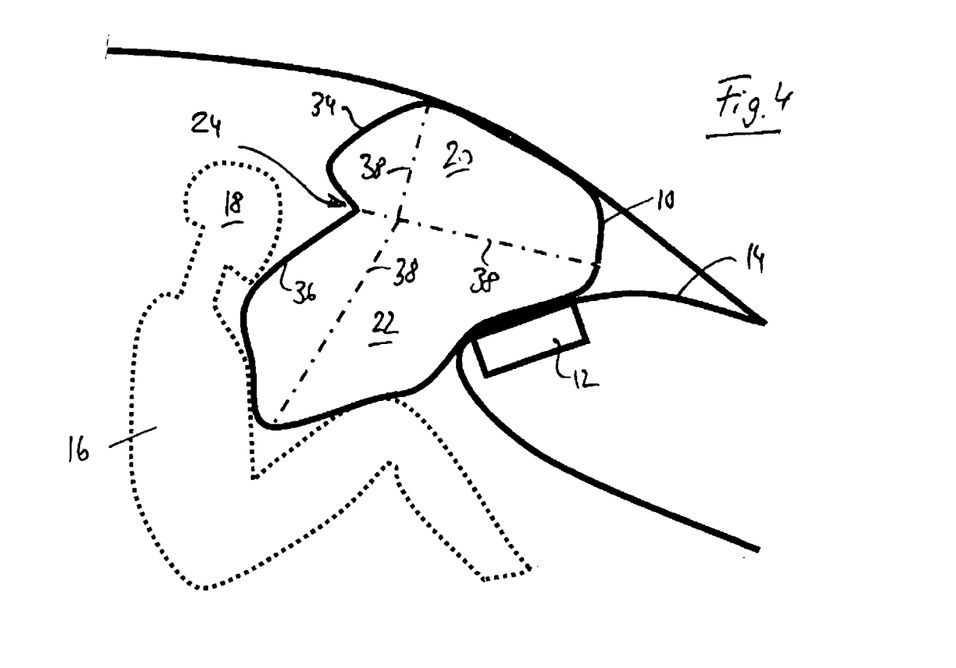
Figure 5:
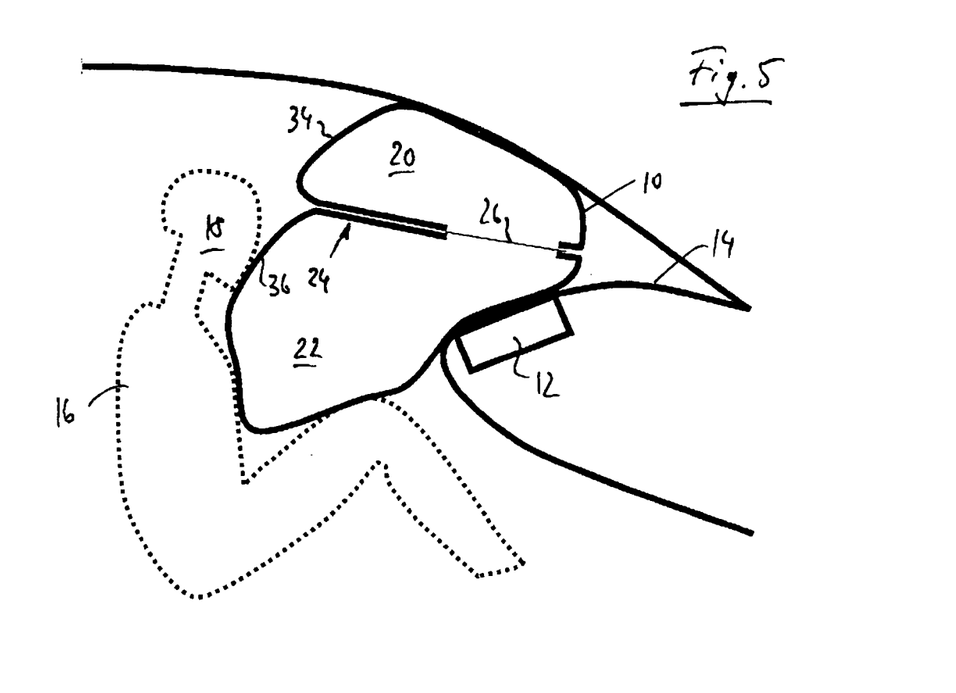
Figure 6:
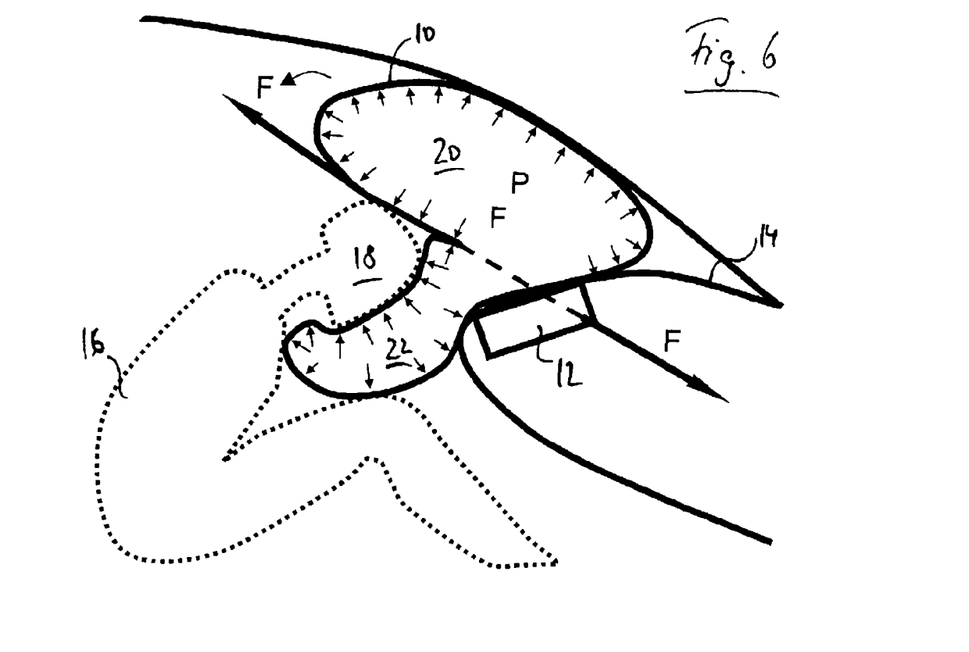

When the inflated gas bag of FIG. 2 is to restrain a small vehicle occupant as depicted in FIG. 2 and in more detail in FIG. 3, head 18 of the vehicle occupant contacts lower cushion portion 22 only, which provides a smooth restraining action. Due to dividing portion 24, the wall of upper cushion portion 20 does not exert a rearwardly directed force on head 18 of vehicle occupant 16, as the traction force resulting from the interior pressure in the gas bag is counteracted by tether 26.

This can be seen in detail in FIG. 4-8 which show a gas bag according to a second embodiment of the invention. The difference between the first and the second embodiment is that in the second embodiment, inflator 12 is arranged at dashboard 14 of the vehicle. The gas bag 10 in this embodiment is formed by two fabric panels 34, 36 which are sewn together with seams 38 along their periphery. Further, tether 26 is attached with its end opposite to dividing portion 24 at inflator 12. The dividing portion 24 is formed by portions of the two different panels 30, 32. It can be seen that tether 26 takes up the load which results from internal pressure P and which tries to move the wall portion situated immediately above head 18 of vehicle occupant 16 upwardly and rearwardly. This allows the wall of lower cushion portion 22 to hinge downwardly unobstructed by upper cushion portion 20, such that a smooth restraining action is provided.

The gas bag of the first embodiment as well as the gas bags of the following gas bags are formed by at least two fabric panels. Depending on the shape of the gas bag, the position and shape of the dashboard as well as the windscreen the gas bag can also be formed by three or more different fabric panels. The dividing portion in each of these cases is formed by two different fabric panels.

Figure 7:
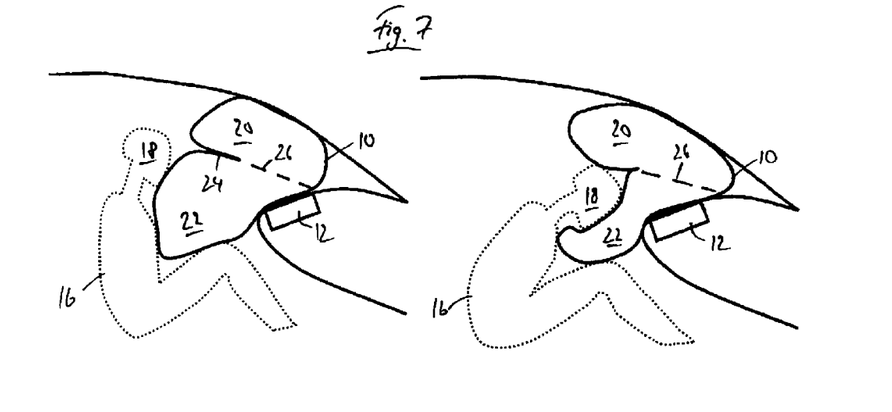
Figure 8:
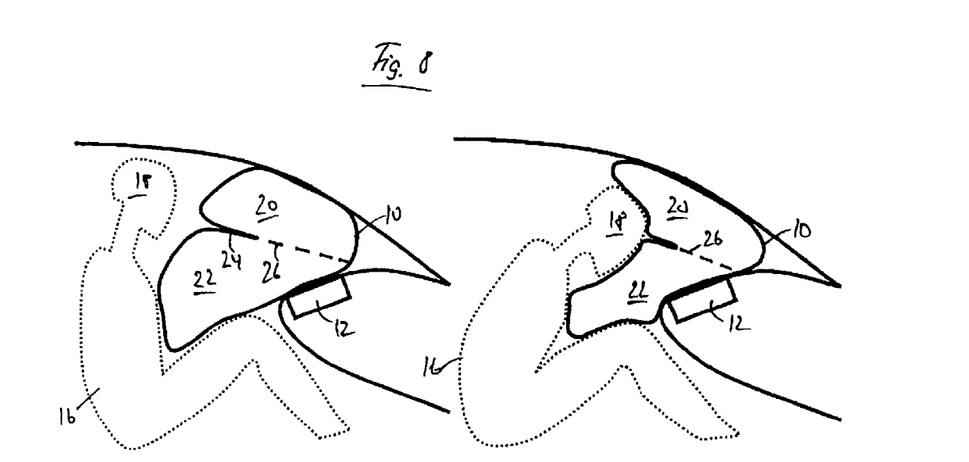

FIGS. 7 and 8 allow to compare the restraining action which the gas bag according to the second embodiment provides for a smaller vehicle occupant (FIG. 7) and a larger vehicle occupant (FIG. 8). While a smaller vehicle occupant is restrained only by lower cushion portion 22, a larger vehicle occupant is restrained by the combined effect of both the upper cushion portion 20 and the lower cushion portion 22. As a result of the internal pressure in gas bag 10, the two wall portions which form dividing portion 24 lie one against the other such that a generally continuous restraining surface is offered to the vehicle occupant, this restraining surface being formed by the wall portions of the upper cushion portion 20 and the lower cushion portion 22, which face the vehicle occupant.

Figure 9:
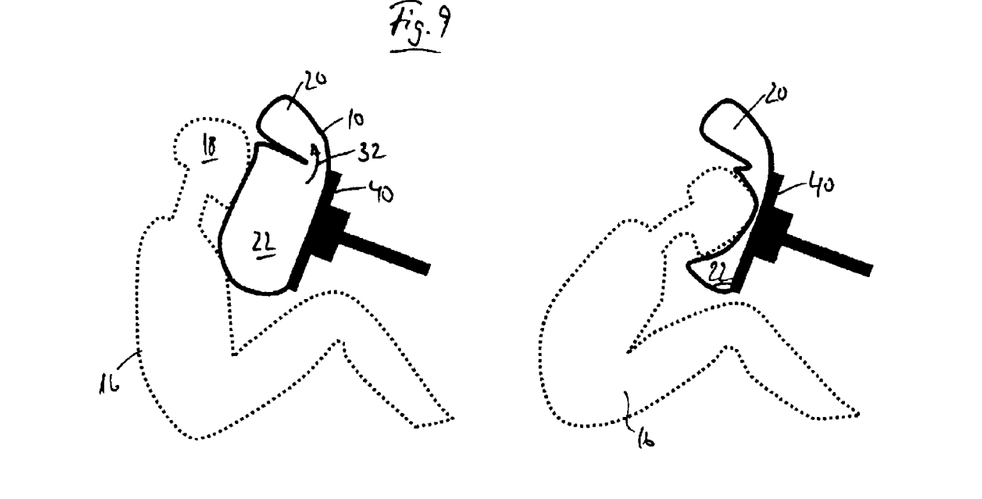
Figure 10:
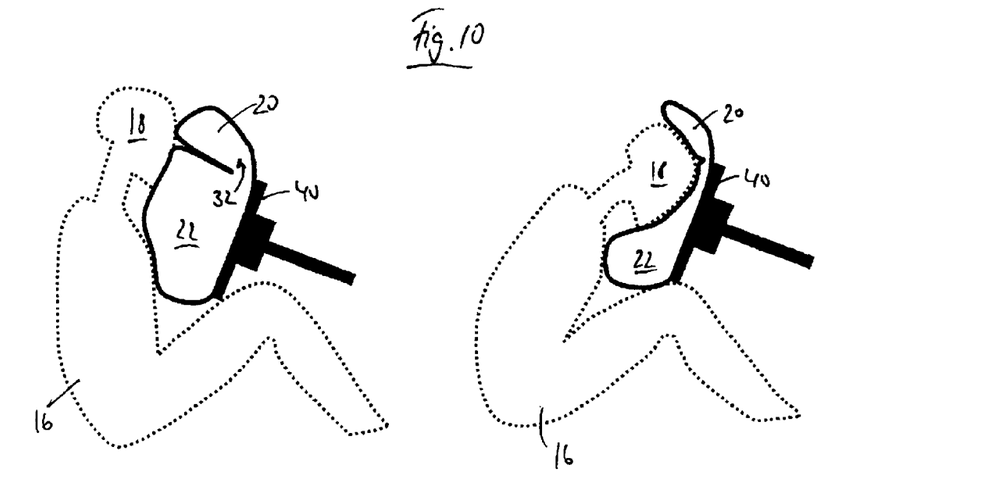

FIGS. 9 and 10 allow to compare the restraining action which is provided by a gas bag according to a third embodiment for a smaller vehicle occupant (FIG. 9) and a larger vehicle occupant (FIG. 10). The gas bag according to the third embodiment is here arranged in a steering wheel 40, with an inflation opening being provided which introduces the gas into lower cushion portion 22. Accordingly, the pressurized gas introduced into lower cushion portion 22 during inflation of the gas bag flows from lower cushion portion 22 to upper cushion portion 20 via overflow passage 32.

In the third embodiment as well, head 18 of a smaller vehicle occupant is restrained by lower cushion portion 22 only. A larger vehicle occupant, however, uses both cushion portions 20, 22 when contacting gas bag 10 (please see FIG. 10).

Figure 11:
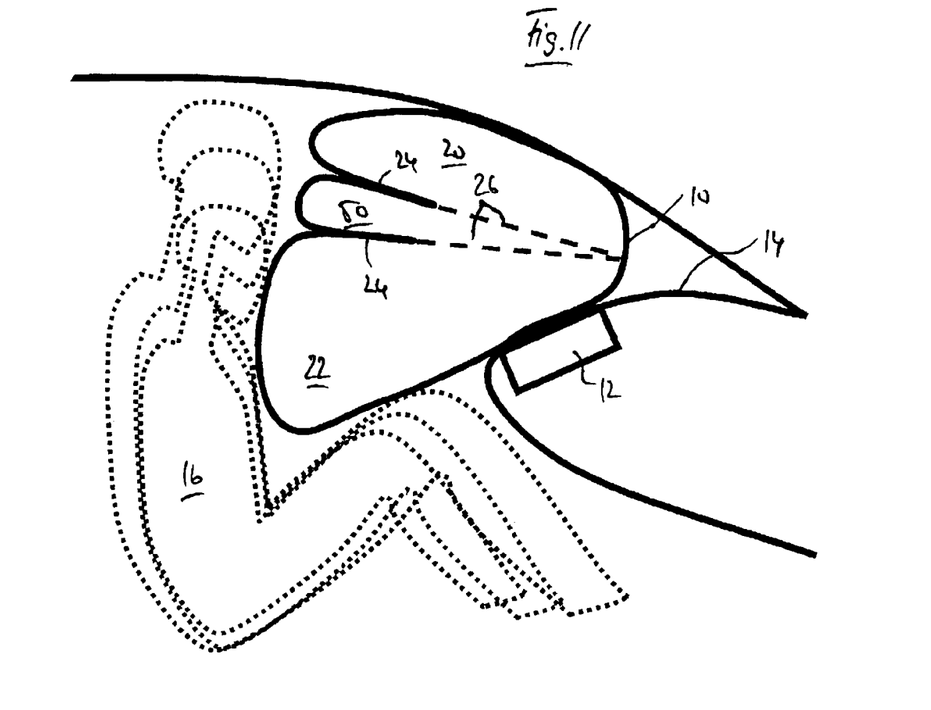

A fourth embodiment of the invention is shown in FIG. 11. Here, an intermediate cushion portion 50 is arranged between upper cushion portion 20 and lower cushion portion 22. Accordingly, two dividing portions are formed, namely an upper dividing portion between upper cushion portion 20 and intermediate cushion portion 50 and a lower dividing portion 24 between intermediate cushion portion 50 and lower cushion portion 22. Provision of intermediate cushion portion 50 improves the restraining effect for a vehicle occupant having an intermediate size.

Figure 12:
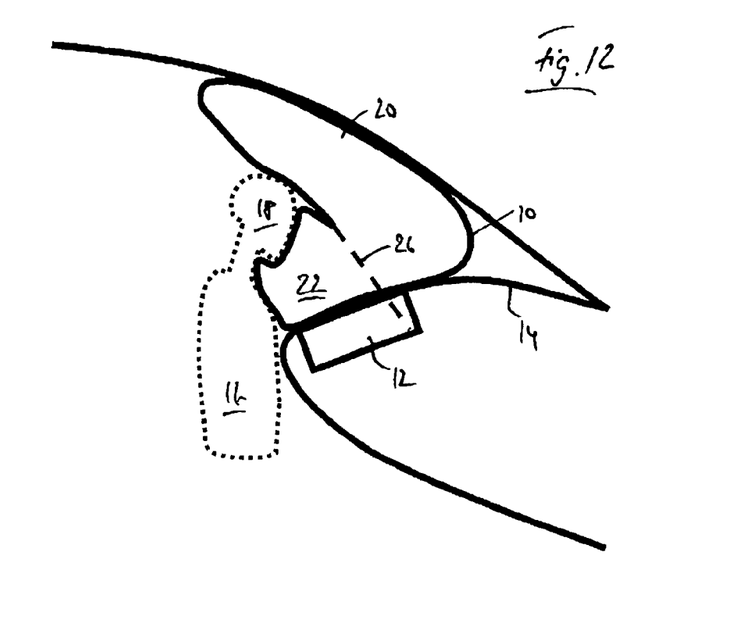

FIG. 12 shows a condition which is known under the term "out of position". Occupant 16 here sits very close to dashboard 14. Despite this sitting position, lower cushion portion 22 can provide a suitable restraining action for head 18 of the vehicle occupant in case of an accident.

Figure 13:
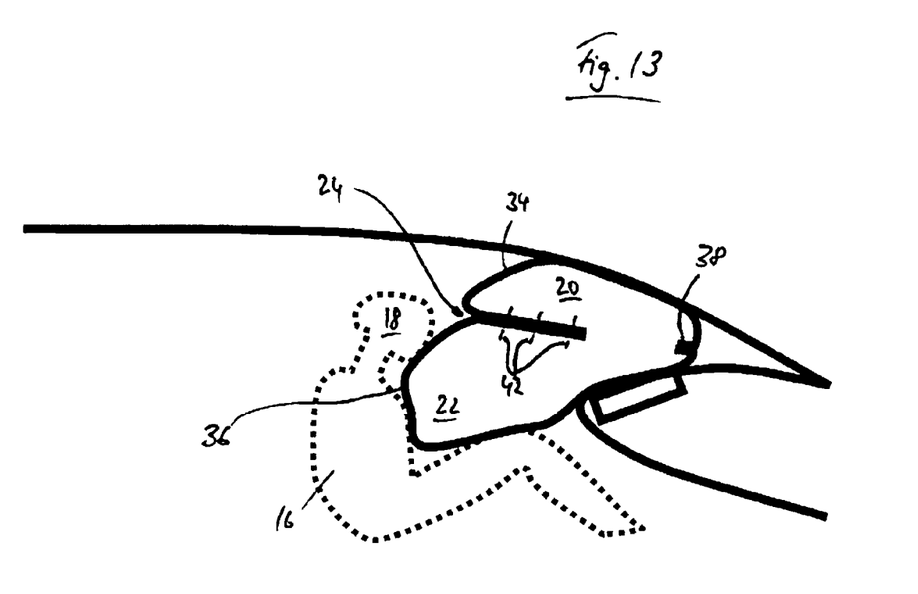

FIG. 13 shows another embodiment similar to the first embodiment. The dividing portion 24 between the upper cushion portion 20 and the lower cushion portion 22 is formed by two portions of the fabric panels 34 and 36. Overlying portions of the two fabric panels are sewn together by tear seams 42. In this example three tear seams are used. It is also possible to use only one, two or more than three tear seams. These tear seams 42 can be used together with a tether 26 or instead. The use of such seams is not limited to an air bag module having the inflator in the dashboard. Such tear seams

The invention claimed is:

1. A gas bag (10) for vehicles, having in an inflated state a lower cushion portion (22) and an upper cushion portion (20) that are sequentially inflated and adapted for restraining a vehicle occupant (16), and a dividing portion (24) between the cushion portions (20, 22) which is formed by two wall portions of the gas bag (10) extending into the interior of the gas bag (10) in a direction away from the cushion portions (20, 22), at least one tether (26) extending from the dividing portion (24) to a side of the gas bag (10), wherein the tether (26), when tensioned, has a fixed length throughout inflation of the gas bag (10) such that the two wall portions lie one against the other in an inflated condition of the gas bag (10).

2. The gas bag of claim 1 wherein the at least one tether (26) extends towards the side of the gas bag (10) which is facing away from the cushion portions (20, 22).

3. The gas bag of claim 2 wherein the end of the tether (26) facing away from the cushion portions (20, 22) is attached at the inflation opening (30).

4. The gas bag of claim 1 wherein the dividing portion (24) is formed by two different fabric panels (34, 36) of the gas bag.

5. The gas bag of claim 1, having an inflation opening (30) which is arranged at a rear side of the lower cushion portion (22), the upper cushion portion (20) being inflated via an overflow passage (32) formed between the dividing portion (24) and the gas bag wall which is facing away from the cushion portions (20, 22).

6. The gas bag of claim 1, having an inflation opening (30) which is arranged at a front side of the upper cushion portion (20), the lower cushion portion (22) being inflated via an overflow passage (32) formed between the dividing portion (24) and the gas bag wall which is facing away from the cushion portions (20, 22).

7. The gas bag (10) of claim 1, being a driver gas bag.

8. The gas bag (10) of claim 1, being a passenger bag.

9. The gas bag (10) of claim 1, wherein the dividing portion (24) extends substantially horizontally through the vehicle.

10. The gas bag (10) of claim 1, wherein inflation fluid cannot flow into one of the upper cushion portion (20) and the lower cushion portion (22) without first flowing into the other of the upper cushion portion (20) and the lower cushion portion (22).

11. The gas bag (10) of claim 1, wherein the lower cushion portion (22) is inflated prior to the upper cushion portion (20) being inflated.

12. The gas bag (10) of claim 1, wherein a majority of the lower cushion portion (22) is positioned entirely below the upper cushion portion (20).

13. The gas bag of claim 1 wherein the tether (26) acts on the dividing portion (24) to divide the gas bag (10) into the lower cushion portion (22) and the upper cushion regardless of the degree to which the gas bag (10) inflates.

14. The gas bag of claim 1, wherein the two wall portions of the gas bag (10) lie one against the other in the inflated condition of the gas bag (10) such that a vehicle occupant striking only the lower cushion portion (22) is restrained by only the lower cushion portion (22) regardless of the degree to which the gas bag (10) inflates.

15. The gas bag of claim 1, wherein the tether (26) has a first end connected to the dividing portion (24) and a second end connected to the gas bag (10), the distance between the first and second ends of the tensioned tether (26) being constant throughout inflation of the gas bag (10).

16. A gas bag (10) for vehicles, having in an inflated state a lower cushion portion (22) and an upper cushion portion (20) adapted for restraining a vehicle occupant (16), and a dividing portion (24) between the cushion portions (20, 22) which is formed by wall portions of the gas bag (10) extending into the interior of the gas bag in a direction away from the cushion portions (20, 22), wherein the dividing portion (24) is formed from two wall portions of the gas bag (10) which in an inflated condition of the gas bag lie one against the other, wherein an intermediate cushion portion (50) is arranged between the lower and the upper cushion portions (20, 22), a dividing portion (24) being formed between the lower cushion portion (22) and the intermediate cushion portion (50), and between the intermediate cushion portion (50) and the upper cushion portion (20).

17. A gas bag (10) for vehicles, having in an inflated state:
a lower cushion portion (22) and an upper cushion portion (20) adapted for restraining a vehicle occupant (16); and
a dividing portion (24) between the cushion portions (20, 22) formed by two wall portions of the gas bag (10) extending into the interior of the gas bag in a direction away from the cushion portions (20, 22), the two wall portions of the gas bag (10) in the inflated state of the gas bag (10) lying one against the other,
wherein the dividing portion is formed by at least one tether (26) secured between the two wall portions of the gas bag (10) forming the dividing portion (24) and extending towards the side of the gas bag (10) facing away from the cushion portions (20, 22), the tether (26) maintaining the two wall portions of the gas bag (10) together such that a vehicle occupant striking only the lower cushion portion (22) is restrained by only the lower cushion portion (22) regardless of the degree to which the gas bag (10) inflates.

* * * * *